US009528073B2

(12) United States Patent
Endo et al.

(10) Patent No.: US 9,528,073 B2
(45) Date of Patent: Dec. 27, 2016

(54) LUBRICANT COMPOSITION AND MECHANICAL MEMBER

(75) Inventors: Toshiaki Endo, Fujisawa (JP); Junichi Imai, Fujisawa (JP); Yutaka Imai, Fujisawa (JP)

(73) Assignee: KYODO YUSHI CO., LTD., Kanagawa (JP)

( * ) Notice: Subject to any disclaimer, the term of this patent is extended or adjusted under 35 U.S.C. 154(b) by 0 days.

(21) Appl. No.: 12/864,143

(22) PCT Filed: Jan. 23, 2009

(86) PCT No.: PCT/JP2009/051067
§ 371 (c)(1),
(2), (4) Date: Jul. 22, 2010

(87) PCT Pub. No.: WO2009/093685
PCT Pub. Date: Jul. 30, 2009

(65) Prior Publication Data
US 2010/0298178 A1 Nov. 25, 2010

(30) Foreign Application Priority Data
Jan. 23, 2008 (JP) .................................. 2008-12776

(51) Int. Cl.
*C10M 169/04* (2006.01)
*F16C 33/66* (2006.01)

(52) U.S. Cl.
CPC ........ *C10M 169/04* (2013.01); *F16C 33/6688* (2013.01); *C10M 2205/0206* (2013.01); *C10M 2207/10* (2013.01); *C10M 2207/16* (2013.01); *C10M 2215/006* (2013.01); *C10M 2215/1026* (2013.01); *C10M 2219/044* (2013.01); *C10M 2219/068* (2013.01); *C10M 2223/045* (2013.01); *C10M 2223/047* (2013.01); *C10N 2230/06* (2013.01); *C10N 2230/12* (2013.01); *C10N 2240/02* (2013.01)

(58) Field of Classification Search
USPC ........................................................ 508/336
See application file for complete search history.

(56) References Cited

U.S. PATENT DOCUMENTS

| | | | |
|---|---|---|---|
| 5,301,923 A | 4/1994 | Asao et al. | |
| 6,037,314 A * | 3/2000 | Kondo et al. ................. | 508/363 |
| 6,652,149 B2 | 11/2003 | Hokao et al. | |
| 2005/0124511 A1 * | 6/2005 | Fujita ................... | C10M 169/00 508/364 |
| 2005/0261141 A1 | 11/2005 | Iso et al. | |
| 2006/0252654 A1 | 11/2006 | Iso et al. | |
| 2006/0252655 A1 | 11/2006 | Iso et al. | |
| 2009/0003742 A1 | 1/2009 | Nakatani et al. | |
| 2009/0136170 A1 | 5/2009 | Sato et al. | |

FOREIGN PATENT DOCUMENTS

| | | |
|---|---|---|
| CN | 101107347 | 1/2008 |
| EP | 1 847 586 | 10/2007 |
| EP | 1 988 147 | 5/2008 |
| JP | 03-210394 | 9/1991 |
| JP | 03-250094 | 11/1991 |
| JP | 10-279981 | 10/1998 |
| JP | 2002-130301 | 5/2002 |
| JP | 2004-108403 | 4/2004 |
| JP | 2005-306965 | 11/2005 |
| JP | 2007-262300 | 10/2007 |
| JP | 2008-111513 | 5/2008 |
| JP | 2008-111514 | 5/2008 |
| JP | 2008-111515 | 5/2008 |
| JP | 2008-111517 | 5/2008 |
| JP | 2008-120858 | 5/2008 |
| JP | 2008-121704 | 5/2008 |
| JP | 2008-127404 | 6/2008 |
| JP | 2008-128270 | 6/2008 |
| WO | 2006/078035 | 7/2006 |
| WO | 2007/037308 | 4/2007 |

OTHER PUBLICATIONS

International Search Report for PCT/JP2009/051067, mailed Feb. 24, 2009.
Endo et al, "Study on Rolling Contact Fatigue in a Hydrogen Atmosphere", Japanese Journal of Tribology, vol. 49, No. 5, 2004, pp. 551-562.
Written Opinion of the International Searching Authority for PCT/JP20091051067, mailed Feb. 24, 2009.
European Search Report issued for European Patent Application No. 09704336.8-2104, dated Feb. 7, 2012.
Chinese Office Action issued for Chinese Patent Application No. 200980102367.1, dated Oct. 30, 2012.

* cited by examiner

*Primary Examiner* — Taiwo Oladapo
(74) *Attorney, Agent, or Firm* — Nixon & Vanderhye P.C.

(57) ABSTRACT

The invention provides a lubricant composition capable of favorably preventing the members from causing hydrogen embrittlement-induced flaking when the members are operated under the conditions where the oil film is thin (namely, the metal surfaces considerably come in contact with each other). The lubricant composition used for lubricating the steel mechanical members operated by a rolling motion or rolling-sliding motion is characterized by containing a base oil and additives, the additives including an organic sulfonate rust inhibitor and a load carrying additive.

7 Claims, No Drawings

LUBRICANT COMPOSITION AND MECHANICAL MEMBER

This application is the U.S. national phase of International Application No. PCT/JP2009/051067 filed 23 Jan. 2009, which designated the U.S. and claims priority to Japan Application No. 2008-012776 filed 23 Jan. 2008, the entire contents of each of which are hereby incorporated by reference.

TECHNICAL FIELD

The present invention relates to a lubricant composition for suitably lubricating steel mechanical members which provide rolling or rolling-sliding motion, and a mechanical member containing the lubricant composition. More particularly, the invention relates to a lubricant composition that can favorably work to prevent the members used in an atmosphere of hydrogen from causing flaking by hydrogen embrittlement, the above-mentioned members including, for example, rolling element bearings, gear wheels, ball threads, linear guides, linear motion guide bearings, a variety of gears, cams or joints and the like used in the fuel-cell related equipment, oil refining related equipment including apparatus designed for hydrocracking, hydrodesulfurization and hydrotreatment of heavy oil, hydrogenation related equipment for chemicals and the like, nuclear electric power generation-related equipment, hydrogen fueling stations and other hydrogen filling infrastructure for fuel cell-powered vehicles, and the like.

BACKGROUND ART

Recent advances in the technology using hydrogen as the energy source have become striking, for example, as in the widespread use of fuel cell. In this field, various improvements in the materials themselves of storage containers, pipes and the like to handle hydrogen have been contemplated, as shown in the technology to store hydrogen under high pressure. The adverse effect of hydrogen on the metal materials has been long studied in the research of corrosion. For example, hydrogen gas generated by cathodic reaction in etching solutions induces cracking as a result of stress concentration. Further, hydrogen is held by adsorption on the surface of the intermediate and precipitate, or hydrogen diffuses into the material through the portions around flaws and is accumulated there to make the portions brittle, to advance the cracking in the material and then result in fracture. The problem of hydrogen embrittlement of metal materials such as steel and the like, i.e., the process where the metal materials lose their ductility following the diffusion of hydrogen into the metal materials has been especially discussed recent years. The progress of hydrogen embrittlement will bring about serious results, i.e., cracking of the metal material and the like. The cracking of metal material by the hydrogen embrittlement is called delayed fracture phenomenon. The delayed fracture is also known as static fatigue where a high-strength member placed under the application of static tensile stress suddenly causes brittle fracture after a length of time. The cause of the delayed fracture in the high-strength member is considered to be hydrogen introduced into the material in the course of manufacturing process thereof or during the operational use thereof. Hydrogen is more likely to diffuse into a metal material of which the lattice vacancy density becomes higher by the plastic deformation, so that hydrogen is accumulated around the portions where the tensile stress is concentrated, that is, the screwed portions, corrosion pits and the like, to induce the fracture, that is, the so-called hydrogen embrittlement of the metal material. Generally, hydrogen occluded in metal, notably in steel, has little effect on the yield strength and tensile strength of the metal, but tends to cause the ductility and toughness of the metal to deteriorate. Accordingly, great attention should be given to hydrogen, especially in high-strength steel. This is because the material for the metal member becomes more susceptible to hydrogen embrittlement as the strength of the metal member is made higher.

There are few researches or studies about hydrogen embrittlement discussed from the viewpoint of tribology. The technology of fuel cell or the like where hydrogen is used as the energy, however, always involves transfer of hydrogen, and mechanical members, for example, relating to travelling are also accompanied by transfer of hydrogen as a matter of course. The compressor, which is one of the typical examples has rolling element bearings, sliding bearings and the like as the tribological elements. Some measures are essential to protect those mechanical members and the metal materials therefor from hydrogen embrittlement, but sufficient countermeasures are not taken at the present stage.

In the field of automobile electrical equipment or auxiliaries thereof, hydrogen embrittlement in the rolling element bearing has become a problem, and this problem has been handled by improving the properties of grease to be employed. For example, addition of an oxidizer for passivation to the grease is proposed in order to inhibit a catalytic action of the metal surface newly appearing as a result of the wear (e.g., JP 3-210394 A). According to the above-mentioned proposal, the metal surface is oxidized to inhibit the catalytic action thereof, thereby preventing the generation of hydrogen that would be caused by decomposition of the lubricant. Also, use of a phenyl ether synthetic oil as the base oil for grease is proposed to prevent the generation of hydrogen caused by decomposition of the lubricant (e.g., JP 3-250094 A). There is another proposal that a particular thickener, an oxidizer for passivation and an organic sulfonate are added to a particular base oil (e.g., JP 5-263091 A). Further, it is proposed that azo compounds capable of absorbing hydrogen be added to the grease used for metal materials required to have tribological properties and for a variety of members, in particular, to the grease to be filled into the bearing used at a portion subject to entry of water (e.g., JP 2002-130301 A). In addition, for the purpose of obtaining a long-life rolling element bearing which does not produce the problem of hydrogen embrittlement-induced flaking even when water permeates through the bearing, a grease composition is proposed where a fluorinated polymer oil, polytetrafluoroethylene as the thickener and an electro-conductive material are added to a base oil (e.g., JP 2002-250351 A).

There are some mechanical members operated by a sliding motion, not by the rolling motion, and the life of those members is limited by wear and seizure instead of flaking. The representative examples of those mechanical members include journal bearing (sliding bearing), piston, screw, rope, chain and the like.

The fatigue life used herein is a useful life of metal determined by rolling fatigue. To use the mechanical members over a period of the above-mentioned fatigue life, thickening of the lubricating oil film is a conventional means.

However, the cause of the flaking occurring in an atmosphere of hydrogen is considered to be hydrogen diffusing into steel to lower the mechanical strength of the steel material (Endo, Dong, Imai, Yamamoto "Study on Rolling Contact Fatigue in Hydrogen Atmosphere" Journal of Japanese Society of Tribologists Vol. 49, No. 10). In light of this, the flaking cannot be prevented only by thickening the lubricating oil film.

JP 2007-262300 A describes that the addition of rust inhibitor such as organic sulfonates, carboxylates, thiocarbamates and the like can effectively prevent the flaking from occurring in an atmosphere of hydrogen. It is believed that a coating of the rust inhibitor can block the entrance of hydrogen.

SUMMARY OF INVENTION

Technical Problem

An object of the invention is to provide a lubricant composition suitably lubricating steel mechanical members operated by a rolling or rolling-sliding motion.

Another object of the invention is to provide a lubricant composition for mechanical members which are operated by a rolling motion or rolling-sliding motion in an atmosphere of hydrogen and have a lubricated steel portion.

A further object of the invention is to provide a lubricant composition for mechanical members including rolling element bearings and the like used in the automobile electrical equipment and the auxiliaries thereof.

A still another object of the invention is to provide a mechanical member containing the above-mentioned lubricant composition.

Solution to Problem

The present invention provides a lubricant composition and a mechanical member shown below.

(1) A lubricant composition for use in lubricating steel mechanical members operated by a rolling motion or rolling-sliding motion, comprising a base oil and additives, wherein the additives include an organic sulfonate rust inhibitor and a load carrying additive.

(2) The lubricant composition as described in (1), wherein the load carrying additive is at least one selected from the group consisting of salts of thiocarbamic acid, salts of thiophosphoric acid, salts of naphthenic acid, salts of carboxylic acid, and organic phosphoric acid esters.

(3) The lubricant composition as described in (1) or (2), wherein the organic sulfonate rust inhibitor is represented by the following formula (I):

wherein $R^1$ is an alkyl group, alkenyl group, alkylnaphthyl group, dialkylnaphthyl group, alkylphenyl group or a residue of high-boiling petroleum distillate, where the alkyl or alkenyl is a straight-chain or branched alkyl or alkenyl group having 2 to 22 carbon atoms; $M^1$ is an alkali metal, alkaline earth metal, zinc or ammonium ion; and $n^1$ indicates the valence of $M^1$.

(4) The lubricant composition as described in any one of (1) to (3), further comprising a thickener.

(5) The lubricant composition as described in any one of (1) to (4), wherein the mechanical member is a rolling element bearing, gear wheel, ball thread, linear guide, linear motion guide bearing, cam or joint which is operated in an atmosphere of hydrogen.

(6) The lubricant composition as described in any one of (1) to (4), wherein the mechanical member is a rolling element bearing for use in the automobile electrical equipment or the auxiliaries thereof.

(7) A mechanical member containing the lubricant composition as described in any one of (1) to (6) mentioned above.

Advantageous Effects of Invention

The present invention can extend the fatigue life determined by metal fatigue and the fatigue life determined by hydrogen embrittlement, without increasing the thickness of the oil film of lubricant composition.

The lubricant composition of the invention can increase the fatigue life of steel determined by metal fatigue, so that the lubricant composition can be suitably used for lubricating the mechanical members operated in a rolling motion or a rolling-sliding motion, for example, rolling element bearings and the like, used in the automobile electrical equipment and the auxiliaries thereof.

The lubricant composition of the invention can extend the fatigue life of steel determined by hydrogen embrittlement, so that the lubricant composition can be suitably used for lubricating the rolling element bearings, gear wheels, ball threads, linear guides, linear motion guide bearings, cams, joints and the like used in an atmosphere of hydrogen.

DESCRIPTION OF EMBODIMENTS

The inventors of this invention have previously conducted a rolling four ball test to find a lubricant composition capable of extending the fatigue life of steel in an atmosphere of hydrogen. In the test, however, a base oil with high viscosity was used, so that the resultant oil film became thick. In other words, the test analysis was made under the conditions that the metal surfaces to be lubricated are not in a direct contact with each other, with the oil film formed between those metal surfaces.

When consideration is given to the operating conditions of steel mechanical members while in practical use, those members are often operated under the conditions that the steel surfaces to be lubricated directly come in contact with each other because the oil film is relatively thin.

In light of the above, the four ball test was then conducted in an atmosphere of hydrogen under the conditions where the oil film was thin enough to bring the surfaces to be lubricated into a direct contact with each other, to evaluate the lubricating properties. The test demonstrated that the fatigue life of steel determined by metal fatigue cannot be satisfactorily extended only by the addition of an organic sulfonate. As a result of further analysis, it has been found that when a load carrying additive is contained in the lubricant composition, in addition to the organic sulfonate, the fatigue life can be extended even though the lubricating conditions become severer. The invention has been thus accomplished based on the above-mentioned findings.

The organic sulfonate rust inhibitor used in the lubricant composition of the invention is a salt of sulfonic acid having an organic lipophilic group. The sulfonic acid includes petroleum sulfonic acids obtainable by sulfonation of the aromatic hydrocarbon ingredient in lube stock and the high boiling petroleum distillate, synthetic sulfonic acids such as dinonyl naphthalene sulfonic acid, heavy alkylbenzene sulfonic acid, and the like. The salt includes metal salts with Ca, Na, Ba, Li, Zn, Pb, Mg and the like, and amine salts with ammonia, ethylenediamine and the like.

As one example of the organic sulfonate, highly basic sulfonates where fine particles of calcium carbonate, calcium hydroxide or the like are dispersed to produce the effect of acid neutralization are commercially available, which are usable as the organic sulfonate salt rust inhibitor in the invention.

In particular, the organic sulfonates represented by formula (I) are preferable.

The organic sulfonate rust inhibitor used in the invention may be either a neutral, basic, or highly basic organic sulfonate. In light of this, the base number of the organic sulfonate is not particularly limited, but preferably 0 to 1000 mg KOH/g.

Preferable specific examples of the organic sulfonate include dioctyl naphthalene sulfonate, dinonyl naphthalene sulfonate, didecyl naphthalene sulfonate, petroleum sulfonate, highly basic alkylbenzene sulfonate and the like.

The organic sulfonate is commonly used as a major additive for the so-called rust inhibiting oil designed for temporary rust prevention of metal products and the like in the storage, transportation, and maintenance thereof. Similar to other rust inhibitors, the organic sulfonate is generally used for the lubricating oil and grease which are strongly required to have rust prevention effect. Basically, the organic sulfonate has neither extreme pressure effect nor friction reduction effect, so that the organic sulfonate is not an additive for improving the lubricating properties.

The content of the organic sulfonate may be preferably 0.1 to 10 mass %, and more preferably 0.2 to 5 mass %, in the lubricant composition of the invention. The content of additive used herein indicates the amount of active ingredient contained in the target material.

The load carrying additive includes salts of thiocarbamic acid, salts of thiophosphoric acid, salts of naphthenic acid, organic phosphoric acid esters, salts of carboxylic acid and the like. The salt includes metal salts with Mo, Zn, Bi, Ni, Cu, Ag, Sb and the like. In particular, salts of thiocarbamic acid and salts of thiophosphoric acid are widely used as the extreme pressure agent or antiwear additive for the lubricating oil. The organic phosphoric acid esters are conventionally well known as the wear prevention agent and widely used in the lubricating oil. Representative examples include tricresyl phosphate (TCP), triphenyl phosphine (TPP), trioctyl phosphate (TOP), triphenyl phosphorothionate (TPPT) and the like.

The content of the load carrying additive may be preferably 0.1 to 10 mass %, and more preferably 0.2 to 5 mass % in the lubricant composition of the invention. The content of additive used herein indicates the amount of active ingredient contained in the target material.

Conventionally, some references describe that organic sulfonates not only have no effect on the prevention of flaking, but also adversely affect the rolling element bearings (for example, JP 2004-125165 A). Therefore, the combined use of the organic sulfonate and the load carrying additive has never been expected to produce the effect as described in the invention, that is, the effect of preventing the flaking induced by hydrogen embrittlement, without thickening the oil film of the lubricant composition.

The lubricant composition of the invention may be formed into a grease composition by the addition of a thickener.

The thickener used for preparation of the grease composition of the invention is not particularly limited. Preferably, soap type thickeners including Li soap and composite Li soap, urea-based thickeners such as diurea, inorganic thickeners such as organic clay and silica, organic thickeners such as PTFE and the like can be used. In particular, urea-based thickeners are preferably used.

Recently, the grease composition containing a urea-based thickener is frequently used for the application where anti-flaking properties are desired. That may be because the rolling contact surface can be protected by the urea compound. Accordingly, when the urea-based thickener is used in the invention, the effect of extending the fatigue life is more significantly exhibited. Further, the urea-based thickener is less disadvantageous, relatively inexpensive, and highly practical when compared with other thickeners.

The content of the thickener in the grease composition of the invention may vary depending on the kind of thickener. The grease composition of the invention may preferably have a consistency of 200 to 400. Namely, the content of the thickener is considered to be the amount necessary to obtain the above-mentioned consistency. In the grease composition of the invention the thickener may be generally contained in an amount of 3 to 30 mass %, preferably 5 to 25 mass %.

The base oil used in the lubricant composition of the invention is not particularly limited. For example, any base oils including mineral oils are usable. In addition to the mineral oils, ester based synthetic oils such as diester and polyol ester, synthetic hydrocarbon oils such as poly α-olefin and polybutene, ether based synthetic oils such as alkyldiphenyl ether and polypropylene glycol, and a variety of synthetic oils such as silicone oils, fluorinated oils and the like can be employed.

The lubricant composition of the invention may further comprise various additives when necessary. Examples of those additives include an oxidation inhibitor, metal corrosion inhibitor, oiliness improver, any other anti-wear agent, solid lubricant, any other rust inhibitor than organic sulfonates, and the like.

To prevent the flaking of steel under an atmosphere of hydrogen, it is required that the steel surface be protected with a close and hard film. For this purpose, formation of a rust inhibiting film by the rust inhibitor such as an organic sulfonate or carboxylate is effective (JP 2007-262300 A). However, if the oil film is thin (in other words, if metal surfaces often come in contact with each other), the above-mentioned coating may come off by the contact. As a result, hydrogen will readily diffuse into the steel to cause the flaking due to hydrogen embrittlement.

The mechanism of improvement in the metal fatigue life by the combined use of the organic sulfonate and the extreme pressure additive according to the invention still remains mostly unknown. The inventors of the invention inferred as follows.

The major role of the rust inhibitor is to form a close adsorption film on the metal surface to prevent the contact of the metal surface with water and oxygen, thereby inhibiting the metal from rusting. In particular, the organic sulfonate has a polar group ($-SO_3^-$) with a strong effect of rust prevention, and is considered to form a harder film than other rust inhibitors, for example, ester (alcohol)-based and amine-based compounds. However, when the lubricating conditions become severer (to such an extent that the oil film parameter Λ is 3 or less), for example, as a result of the increase of the surface roughness or the local contact pressure or the use of a lubricant with low viscosity, the rust inhibiting film is supposed to partially rupture, so that the contact of metal surfaces will inevitably occur. According to the invention, a solid film of load carrying additive is formed over the rust inhibiting film to protect the rust inhibiting film in the area to be lubricated as mentioned above, so that the diffusion of hydrogen into steel can be inhibited to prevent the flaking of steel even though the oil film is thin.

The invention will now be explained more specifically with reference to the following examples.

EXAMPLES 1 TO 16 AND COMPARATIVE EXAMPLES 1 TO 9

As shown in Tables 1 to 3, the predetermined amounts of additives were added to the base oil to prepare lubricant compositions.

1. Evaluation Test Method
(1) Outline of Test

Three steel balls with a diameter of 15 mm designed for bearing were disposed in a container with an inner diameter of 40 mm and a height of 14 mm, which was filled with about 20 ml of a test oil. On the three steel balls, one rotary steel ball (⅝-in) for bearing was placed, and then the container was set in a test machine. The four balls were rotated for 4 hours for shakedown under application of a load, and then hydrogen gas was introduced into the test oil. The lower three balls revolved as each rotating on its axis. The balls were made to rotate continuously until the flaking took place. The flaking occurred at a point between the balls having the highest contact pressure. The fatigue life was expressed as the total number of contact times with the upper rotary ball counted when the flaking took place. The above-mentioned procedure was repeated five times to determine the life (L50) in terms of the average number of contact times at which 50% of the balls reached the end of fatigue life.

Test Conditions

Steel balls for test: 15 -mm-dia. steel balls and ⅝-in steel ball for bearing
Feed rate of hydrogen gas: 15 to 20 ml/min.
Purity of hydrogen: 99.99%
Load (W) for test: 100 kgf
Maximum local contact pressure: 4.1 GPa
Rotational speed (n): 1500 rpm
The repeated number of tests: 5 (average life: obtained by n=5)

The results are shown in Tables 1 to 3.

TABLE 1

| | Examples | | 1 | 2 | 3 | 4 | 5 | 6 | 7 | 8 |
|---|---|---|---|---|---|---|---|---|---|---|
| Base oil | | | PAO6 | PAO6 | PAO6 | PAO6 | PAO6 | PAO6 | PAO6 | PAO6 |
| Organic sulfonate (mass %) | A | Ca sulfonate | 2 | 2 | 2 | 2 | 2 | 0.5 | 5 | 2 |
| | B | Zn sulfonate | — | — | — | — | — | — | — | — |
| Load carrying additive (mass %) | C | MoDTC | 1 | — | — | — | — | 5 | — | — |
| | D | ZnDTC | — | 1 | — | — | — | — | 0.5 | 1 |
| | E | ZnDTP | — | — | 1 | — | — | — | — | — |
| | F | TPPT | — | — | — | 1 | — | — | — | — |
| | G | Zn naphthenate | — | — | — | — | 1 | — | — | — |
| Thickener (mass %) | H | Aromatic diurea | — | — | — | — | — | — | — | 17 |
| Rolling four-ball test Life L50 (×10⁶ times) | | | 20< | 20< | 20< | 20< | 20< | 20< | 20< | 20< |

TABLE 2

| | Examples | | 9 | 10 | 11 | 12 | 13 | 14 | 15 | 16 |
|---|---|---|---|---|---|---|---|---|---|---|
| Base oil | | | PAO6 | PAO6 | PAO6 | PAO6 | PAO6 | PAO6 | PAO6 | PAO6 |
| Organic sulfonate (mass %) | A | Ca sulfonate | — | — | — | — | — | — | — | — |
| | B | Zn sulfonate | 2 | 2 | 2 | 2 | 2 | 0.5 | 5 | 2 |
| Load carrying additive (mass %) | C | MoDTC | 1 | — | — | — | — | — | — | — |
| | D | ZnDTC | — | 1 | — | — | — | — | — | — |
| | E | ZnDTP | — | — | 1 | — | — | 5 | — | 1 |
| | F | TPPT | — | — | — | 1 | — | — | 0.5 | — |
| | G | Zn naphthenate | — | — | — | — | 1 | — | — | — |
| Thickener (mass %) | H | Aromatic diurea | — | — | — | — | — | — | — | 17 |
| Rolling four-ball test Life L50 (×10⁶ times) | | | 20< | 20< | 20< | 20< | 20< | 20< | 20< | 20< |

TABLE 3

| Comparative Examples | | | 1 | 2 | 3 | 4 | 5 | 6 | 7 | 8 | 9 |
|---|---|---|---|---|---|---|---|---|---|---|---|
| Base oil | | | PAO6 | PAO6 | PAO6 | PAO6 | PAO6 | PAO6 | PAO6 | PAO6 | PAO6 |
| Organic sulfonate (mass %) | A | Ca sulfonate | — | 2 | — | — | — | — | — | 4 | — |
| | B | Zn sulfonate | — | — | 2 | — | — | 2 | 2 | — | — |
| Load carrying additive (mass %) | C | MoDTC | — | — | — | — | — | — | — | — | 2 |
| | D | ZnDTC | — | — | — | 1 | — | — | — | — | — |
| | E | ZnDTP | — | — | — | — | 1 | — | — | — | — |
| | F | TPPT | — | — | — | — | — | — | — | — | — |
| | G | Zn naphthenate | — | — | — | — | — | — | — | — | — |
| Thickener (mass %) | H | Aromatic diurea | — | — | — | — | — | 17 | 17 | — | — |
| Rolling four-ball test Life L50 (×10$^6$ times) | | | 3.3 | 10.4 | 11.2 | 10.2 | 9.6 | 12.7 | 12.7 | 12.6 | 9.4 |

Base Oil:
PAO6: poly α-olefin (with a kinetic viscosity of 30.5 mm$^2$/s at 40° C.).
Additives:
A: Ca salt of dinonyl naphthalene sulfonic acid
B: Zn salt of dinonyl naphthalene sulfonic acid
C: Thiocarbamate (MoDTC)
D: Thiocarbamate (ZnDTC)
E: Thiophosphate (ZnDTP)
F: Sulfur-phosphorus based extreme pressure agent (TPPT)
G: Zn salt of naphthenic acid
Thickener:
H: Diurea compound obtained from diphenylmethane isocyanate and p-toluidine (The additive H made the composition into a grease, and the grease was adjusted to have a consistency of 350 ± 15.)

The lubricant compositions prepared in Examples 1 to 16 according to the invention containing both the organic sulfonate rust inhibitor and the load carrying additive showed remarkably long fatigue life as expressed by 20×10$^6$ times or more.

In contrast to this, the lubricant compositions of Comparative Examples 1 to 9, containing either the organic sulfonate rust inhibitor or the load carrying additive, or containing none of them exhibited the fatigue life ranging from 3.3×10$^6$ to 12.7×10$^6$, indicating far shorter fatigue life as compared with that in Examples.

The above-mentioned results clearly demonstrate that the fatigue life under an atmosphere of hydrogen can be remarkably extended by the combined use of the organic sulfonate and the load carrying additive, without thickening the oil film.

The invention claimed is:

1. A lubricant composition for use in a rolling element bearing, comprising a base oil and additives, wherein the additives include an organic sulfonate rust inhibitor and a load carrying additive,
   wherein the base oil consists of a synthetic oil selected from the group consisting of ester based synthetic oils, poly-alpha-olefin and ether based synthetic oils,
   the organic sulfonate rust inhibitor is selected from the group consisting of a salt of dinonyl naphthalene sulfonic acid with Na, Ba, Li, Zn, Pb or Mg,
   the load carrying additive is ZnDTP,
   wherein the total mass of the base oil is at least 80% by mass of the lubricant composition,
   the content of the organic sulfonate is 0.1 to 10 mass % in the lubricant composition, and
   the content of the load carrying additive is 0.1 to 10 mass % in the lubricant composition.

2. The lubricant composition of claim 1, further comprising a thickener.

3. A mechanical member containing the lubricant composition of claim 1.

4. The mechanical member of claim 3, wherein the mechanical member is a rolling element bearing, gear wheel, ball thread, linear guide, linear motion guide bearing, or cam which is operated in an atmosphere of hydrogen.

5. The lubricant composition of claim 1, wherein the lubricant composition is configured as a lubricant in a rolling element bearing in automotive electrical equipment or auxiliaries of automotive equipment.

6. The mechanical member of claim 3, wherein the mechanical member is a rolling element bearing in automotive electrical equipment or auxiliaries of automotive equipment.

7. A lubricant composition for use in a rolling element bearing, comprising a base oil, an urea-based thickener and additives, wherein the additives include an organic sulfonate rust inhibitor and a load carrying additive,
   wherein the base oil consists of a synthetic oil selected from the group consisting of ester based synthetic oils, poly-alpha-olefin and ether based synthetic oils,
   the organic sulfonate rust inhibitor is selected from the group consisting of a salt of dinonyl naphthalene sulfonic acid with Na, Ba, Li, Zn, Pb or Mg,
   the load carrying additive is ZnDTP,
   the total mass of the base oil is at least 55% by mass of the lubricant composition,
   the content of the urea-based thickener is 5 to 25% by mass of the lubricant composition,
   the content of the organic sulfonate is 0.1 to 10 mass % in the lubricant composition,
   the content of the load carrying additive is 0.1 to 10 mass % in the lubricant composition.

* * * * *